United States Patent
Seeburger et al.

[15] 3,655,523
[45] Apr. 11, 1972

[54] METHOD FOR SEPARATING A 2- AND 4-CHLOROBIPHENYL FROM THE CORRESPONDING HYDROXYBIPHENYL COMPOUNDS

[72] Inventors: Harold O. Seeburger; Lee H. Horsley, both of Midland, Mich.

[73] Assignee: The Dow Chemical Company, Midland, Mich.

[22] Filed: Oct. 15, 1969

[21] Appl. No.: 866,734

[52] U.S. Cl..................................203/59, 203/64, 203/65, 203/91, 260/620, 260/649 D
[51] Int. Cl. ...................................B01d 3/36, C07c 25/18
[58] Field of Search....................203/48, 50, 55, 56, 57, 59, 203/63, 64, 65, 66, 70; 260/707, 649, 649 DP, 620

[56] References Cited

UNITED STATES PATENTS

| | | | |
|---|---|---|---|
| 2,776,937 | 1/1957 | Filar | 203/48 |
| 2,129,908 | 9/1938 | Britton | 203/48 |
| 1,836,307 | 12/1931 | Britton | 203/59 X |
| 1,890,427 | 12/1932 | Britton et al. | 203/48 |
| 1,951,577 | 3/1934 | Malowan | 260/649 DP |
| 2,442,229 | 5/1948 | Berg et al. | 203/59 X |

OTHER PUBLICATIONS

Chemical Abstract Vol. 48 (1954) Azeotropy Distill.

*Primary Examiner*—Wilbur L. Bascomb, Jr.
*Attorney*—Griswold and Burdick

[57] ABSTRACT

2-Chlorobiphenyl, 4-chlorobiphenyl or mixtures thereof may be separated from a mixture with the corresponding hydroxybiphenyl compound by adding to the mixture of such compounds an azeotropic agent which is a glycol, glycol monoalkyl or phenyl ether, glycerol, glycerol alkyl ether, alkanolamine or dialkylenetriamine having a boiling point within about 45° C. of the halobiphenyl compound at atmospheric pressure, and then fractionally distilling the mixture thus formed at a pressure of up to about 200 mm. Hg. absolute.

6 Claims, No Drawings

METHOD FOR SEPARATING A 2- AND 4-CHLOROBIPHENYL FROM THE CORRESPONDING HYDROXYBIPHENYL COMPOUNDS

BACKGROUND OF THE INVENTION

Chlorinated biphenyl compounds may be hydrolyzed to form the corresponding hydroxybiphenyl compound where the hydroxyl group replaces the halogen. The hydrolysis is rarely if ever complete, resulting in a reaction product that is a mixture of the halogenated biphenyl and the corresponding hydroxybiphenyl. The chloro and hydroxy compounds have close boiling points and are extremely difficult to separate by ordinary distillation. This difficulty has initiated a search for a convenient and effective method of separating the halogenated biphenyl from the corresponding hydroxy compound.

SUMMARY OF THE INVENTION

According to the present invention, 2-chloro-biphenyl, 4-chlorobiphenyl or mixtures thereof are separated from the corresponding hydroxyl compounds by adding to the mixture of such compounds an azeotropic agent which is a glycol, glycol monoalkyl or phenyl ether, glycerol, glycerol alkyl ether, alkanolamine or dialkylenetriamine having a boiling point within about 45° C. of the chlorinated component at atmospheric pressure, and then fractionally distilling the mixture thus formed at a pressure of up to 200 mm. Hg. absolute.

The process of the present invention is conveniently adapted to either a batch or preferably a continuous flow operation. In a continuous flow operation, a mixture of the chlorobiphenyl, the corresponding hydroxybiphenyl, and the azeotropic agent are fed into an intermediate point of a distillation column. The column is held under a pressure less than 200 mm. Hg. absolute and is heated to distill the lower boiling fraction. The halohydrocarbon and the azeotropic agent are collected as the distillate, and the corresponding hydroxy compound is collected as the residue.

The essential and novel feature of the present invention is the separation of mixtures of 2-chlorobiphenyl, 4-chlorobiphenyl or mixtures thereof from the corresponding hydroxybiphenyl compounds o-phenylphenol and p-phenylphenol by the use of these particular azeotropic agents. The azeotropic agents may be a lower alkylene glycol, lower alkylene glycol monoalkyl or phenyl ether, glycerol, glycerol alkyl ether, alkanolamine or lower dialkylenetriamine having a boiling point within 45° C. of the halogenated hydrocarbon at atmospheric pressure. Azeotropic agents having a boiling point within 30° C. of the halogenated hydrocarbon, and those having a boiling point below the halobiphenyl compound are preferred. Representative examples of these agents include: lower alkylene glycols such as diethylene glycol, triethylene glycol, dipropylene glycol, tripropylene glycol and dibutylene glycol; glycol monoalkyl ethers such as triethylene glycol monomethyl ether, ethylene glycol phenyl ether, diethylene glycol n-butyl ether tripropylene glycol monomethyl ether and propylene glycol monophenyl ether; glycerol alkyl ethers such as glycerol monomethyl ether; alkanolamines such as diethanolamine, triethanolamine, dipropanolamine and diisopropanolamine; and lower dialkylenetriamines such as diethylenetriamine and dipropylenetriamine. Of these compounds, triethylene glycol monomethyl ether, diisopropanolamine, dipropylenetriamine and diethylene glycol are specially preferred azeotropic agents.

The azeotropic distillation of the invention may suitably be applied to 2-chlorobiphenyl, 4-chlorobiphenyl or mixtures thereof. Such compounds are well known and readily available. A mixture of all four components may be separated by azeotropic distillation by adding an azeotropic agent to the mixture and distilling both chlorinated compounds simultaneously. In the preferred practice of the present invention, 2-chlorobiphenyl is separated from o-phenylphenol.

The comparative concentrations of the halogenated compound and the corresponding hydroxyl compound may vary widely. Essentially any concentration of the two or more components in the mixture may be separated by the present invention. In the preferred practice of the invention, a minor amount of the halohydrocarbon is present in the mixture.

The amount of azeotropic agent added to the mixture of the chlorobiphenyl and the corresponding hydroxy compound may vary widely as will be seen in the Examples. Generally, the smallest amount of azeotropic agent required to give the desired separation is used so that the heat introduced during distillation is most efficiently employed. The amount of azeotropic agent required is dependent on the amount of halohydrocarbon in the mixture, the azeotropic agent employed, the operating pressure, and the apparatus used in the distillation. The optimum amount of azeotropic agent for a particular system is best determined by experience using these factors as a guide.

Many of the azeotropic agents of the present invention are at least partially insoluble in the halohydrocarbon. Accordingly, the condensed distillate usually forms two phases. This phenomenon is especially advantageous since it permits easy separation of the azeotropic agent from the halohydrocarbon and simple recycling of the azeotropic agent to the distillation.

After the addition of the azeotropic agent, the distillation of the mixture is conducted under a subatmospheric pressure of up to about 200 mm. Hg. absolute, with pressures of 1 to 100 mm. Hg. absolute being preferred. As the pressure is increased, the distinctness of the separation is decreased and more of the hydroxy compound appears in the distillate.

Thus, by using the azeotropic agents of the present invention, 2-chlorobiphenyl may be separated from orthophenylphenol, 4-chlorobiphenyl may be separated from p-phenylphenol or mixtures of the four components may be separated in a convenient and economical process.

SPECIFIC EMBODIMENTS

Example 1 - Separation of 2-Chlorobiphenyl from o-Phenylphenol

To a mixture containing 95 percent by weight o-phenylphenol (b.p. 275° C.) and approximately 5 percent by weight 2-chlorobiphenyl (b.p. 268° C.), 25 percent by weight of an azeotropic agent was added and 3 to 15 percent of the mixture was distilled at reduced pressure in a 1-⅛ inch x 30 inch column packed with ¼ inch Berl saddles at a 5/1 reflux ratio. The azeotropic agents, distillation conditions and results are shown in Table I.

TABLE I
[Separation of 2-chlorobiphenyl (2-CBP) from o-phenylphenol]

| Azeotropic agent | B.p.,° C. at 760 mm. Hg | Pressure, mm. Hg | Dist'n. temp., ° C. | Wt. percent azeo. agent in dist. | Wt. percent 2-CBP (azeo. agent free) | | |
|---|---|---|---|---|---|---|---|
| | | | | | Original | Distillate | Residue |
| None | | 10 | 136 | | 4.75 | 66.9 | 1.83 |
| Do | | 50 | 177 | | 4.75 | 53.6 | 2.77 |
| Triethylene glycol monomethyl ether | 249 | 10 | 119 | 75 | 5.23 | 98.5 | 0.2 |
| Diisopropanolamine | 249 | 10 | 127 | 50 | 5.40 | 100.0 | 0.9 |
| Dipropylenetriamine | 240 | 10 | 122 | 75 | 6.90 | 98.0 | 0.1 |
| Diethylene glycol | 245 | 10 | 125 | 69 | 4.40 | 82.5 | 0.1 |
| Do | 245 | 100 | 175 | 53 | 5.75 | 94.4 | 0.8 |
| Do | 245 | 200 | 197 | 50 | 6.80 | 73.5 | 2.6 |
| Diethanolamine | 268 | 10 | 139 | 3.5 | 6.10 | 67.5 | 0.7 |
| Glycerol | 290 | 10 | 136 | 3.8 | 6.70 | 64.0 | 0.4 |
| Tripropylene glycol | 267 | 10 | 140 | 2.2 | 5.20 | 59.0 | 1.6 |
| Triethylene glycol | 289 | 10 | 137 | 0.8 | 6.4 | 58.0 | 1.2 |

Example 2 - Separation of 2- and 4-Chlorobiphenyl from o- and p-Phenylphenol

To a mixture containing 67.5 wt. percent o-phenyl-phenol (b.p. 275), 22.5 wt. percent p-phenylphenol (b.p. 305), 5 wt. percent 2-chlorobiphenyl (b.p. 268), and 5 wt. percent 4-chlorobiphenyl (b.p. 282) was added 25 wt. percent diethylene glycol as an azeotropic agent. The mixture was distilled in the same manner as shown in Example 1. The distillate contained 49 wt. percent of the azeotropic agent, the aromatics in the distillate were 99.3 wt. percent chlorinated biphenyls and the residue contained only 0.75 wt. percent chlorinated biphenyl.

In the same manner as described in the examples above, 4-chlorobiphenyl may be separated from a mixture with p-phenylphenol by using any of the azeotropic agents of Example 1.

We claim:

1. A method for separating 2-chlorobiphenyl, 4-chlorobiphenyl or mixtures thereof from a mixture with o-phenylphenol, p-phenylphenol or mixture thereof, comprising adding to the mixture of the chlorinated biphenyl and the corresponding hydroxybiphenyl compound an azeotropic agent for the chlorobiphenyl selected from the group consisting of a lower alkylene glycol, glycol monoalkyl or phenyl ether, glycerol, glycerol lower alkyl ether, alkanol-amine, or dialkylenetriamine, such azeotropic agent having a boiling point within 45° C. of the halobiphenyl at atmospheric pressure, and then fractionally distilling the mixture thus formed at a pressure of up to 200 mm. Hg. absolute.

2. The method of claim 1 wherein the azeotropic agent has a boiling point within 30° C. of the chlorobiphenyl compound at atmospheric pressure.

3. The method of claim 1 wherein the azeotropic agent boils at a temperature below the chlorobiphenyl compound at atmospheric pressure.

4. The process of claim 1 wherein the azeotropic agent is triethylene glycol monomethyl ether, diisopropanolamine, dipropylenetriamine or diethylene glycol.

5. The process of claim 1 wherein 2-chloro-biphenyl is separated from o-phenylphenol.

6. The method of claim 1 wherein the fractional distillation is conducted at a pressure of 1 to 100 mm. Hg. absolute.

* * * * *